United States Patent Office 3,341,289
Patented Sept. 12, 1967

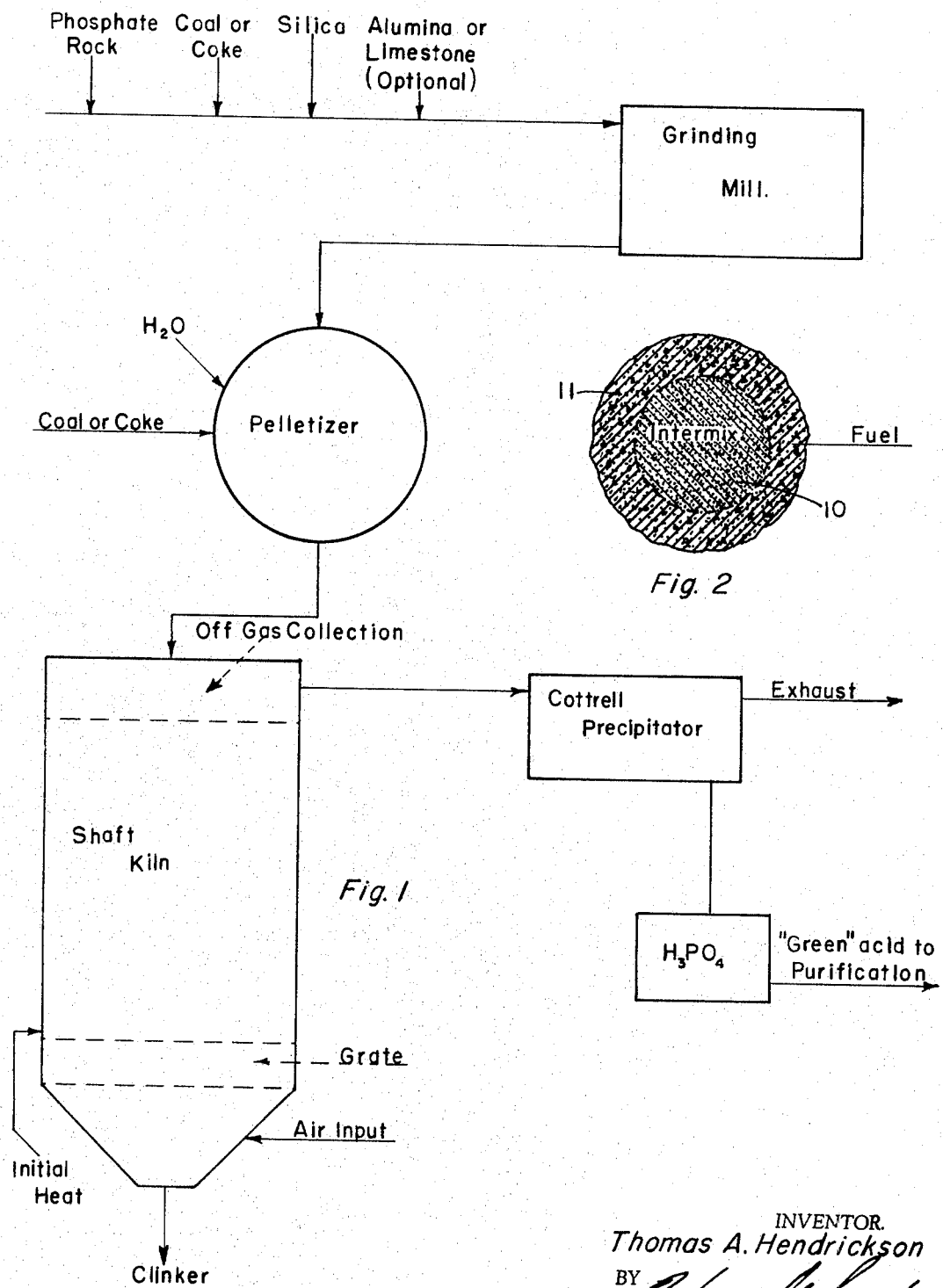

3,341,289
PRODUCTION OF ORTHO PHOSPHORIC ACID
Thomas A. Hendrickson, Golden, Colo., assignor to Cameron and Jones, Incorporated, Denver, Colo., a corporation of Colorado
Filed Sept. 3, 1963, Ser. No. 305,931
15 Claims. (Cl. 23—165)

This invention relates to the production of phosphoric acid, and more particularly to the method of such production characterized by pyrolytic treatment of natural phosphatic materials, and has as an object to provide a novel and improved such method distinguished by simplicity, high efficiency, and economy of practice.

A further object of the invention is to provide a novel and improved method for the production of phosphoric acid from natural phosphatic materials that is suited for realization through apparatus and equipment of known type and ready availability.

A further object of the invention is to provide a novel and improved method for the production of phosphoric acid from natural phosphatic materials that is continuous and thermally self-sustaining in operation.

A further object of the invention is to provide a novel and improved method for the production of phosphoric acid from natural phosphatic materials that is distinguished by a unique promotion and correlation of pyrolytic reactions.

A further object of the invention is to provide a novel and improved method for the production of phosphoric acid from natural phosphatic materials that is efficiently applicable to the processing of crude feed supplied as commonly available in an extensive range of grade and quality.

A further object of the invention is to provide a novel and improved method for the production of phosphoric acid from natural phosphatic materials that is effective at option to coincidentally upgrade the use potential and value of a commonly-worthless by-product.

A further object of the invention is to provide a novel and improved organization, combination, and sequential relation of steps and phases constituting a method for the production of phosphoric acid from natural materials.

With the foregoing and other objects in view, my invention consists in the nature and operative correlation of actions and influences constituting a method or process as hereinafter set forth, pointed out in the appended claims, and exemplified by the accompanying drawing, in which:

FIGURE 1 is a flow sheet diagrammatically symbolizing the method of the invention as related for practice with and by means of typically-represented conventional apparatus and equipment.

FIGURE 2 is a detail view in substantially-diametric section of a feed material pellet evolved during and significant to intended practice of the method of the invention.

Pyrolytic reduction of natural phosphate rock in comminuted admixture with fuel and a suitable flux followed by oxidation of the resulting vapors is known and established practice incident to the production of phosphorus and phosphoric acid that is documented beyond occasion for elaboration herein. As variously adapted, extended, and refined, practical application of the principles primary to the practice hitherto known has been somewhat hampered by the expense and complexity of the specialized equipment thought to be necessary, by the assumption that the reducing and oxidizing reactions should be separately and successively accomplished, by the inability, for reasons of expense, to efficiently utilize other than the higher grades and better qualities of the requisite feed materials, by the dependence in many instances upon an adequate supply of inexpensive electrical power, and by the very low value and relative inutility of the slag, or solids residue, output consequential to the smelting phase of the operation. Corrective of the deficiencies and inadequacies hitherto prevalent in the known art and practice, the instant invention is directed to the provision of a method uniquely characterized to apply the known essential principles of the pertinent art for production of phosphoric acid from natural phosphatic materials with economy, efficiency, and manifest practical advantage.

In common with conventional related practice, and as represented by FIGURE 1, natural phosphate rock, carbonaceous fuel, such as coal or coke, and a flux, such as silica, are passed in suitable initial condition and proportioned combination through a conventional grinding mill for thorough admixture and reduction to desired particle size. Apportioned with customary attention to individual grade or quality, the phosphate rock, fuel, and flux are continuously supplied, either intermixed or separately, to the grinding mill which is conventionally organized to deliver a correspondingly-continuous output of the infeed characterized by approximately one part, by weight, of the flux to from four to eight parts of fuel and from thirty to thirty-five parts of the phosphate rock uniformly and intimately admixed in a fineness desirably such as will pass through a one hundred mesh screen.

Significantly distinguishing from the prevailing practices of the art, the intermix output from the grinding mill is passed to a pelletizer of known and available type and construction conventionally effective subject to regulable supply of water to consolidate the initially-dry, granular intermix into the form of multiple, compact, moisture-bonded pellets ranging from three-quarters of an inch to perhaps two inches in diametric size, and subsequently to exteriorly envelop the so-formed pellets, as an automatically-progressive function of the equipment, with a coating layer of fuel, such as coal or coke, supplied in pulverized condition as an independent and supplemental continuous feed to the pelletizer subject to expedient regulable control, whereby to transform the dry, granular intermix input to the pelletizer into a congeries of similar, globular components alike constituted, as represented by FIGURE 2, of a moisture-bonded core 10 of the intermix material invested by a sheath 11 of fuel moisture-bonded and adhered to the core which, as compound pellets, comprise the output from the pelletizer.

Readied by the pelletizer in the manner and to the form just discussed, the intermix is conditioned for unique pyrolytic reactions in accordance with the principles and to realize the advantages of the invention. Conventionally recognized and applied in the related art, it is established that calcining of the characteristic intermix of phosphate rock, fuel, and flux at temperatures on the order of, and above, 2600° F. in the substantial absence of oxygen induces a reaction that liberates elemental phosphorus from the phosphate rock in a state for subsequent oxidation to phosphorus pentoxide vapor which in turn reacts with water to form phosphoric acid. Distinctively conditioned by the pelletizing treatment above described to accomplish, as will hereinafter appear, the several reactions and exposures requisite for the evolution of phosphoric acid from the intermix in an appropriate single pass of the compound pellets through adequate heat countercurrent to uprise of air, an important economic advantage and a unique aspect of the invention develop from the facility with which the necessary calcining operation may be simply and inexpensively achieved through and by means of known apparatus and equipment readily available in a considerable specific diversity.

Typical of conventional equipment suited to appropriately effect the pyrolytic phase of the present invention there is included in FIGURE 1 the representation of a shaft kiln comprising, as is usual, a vertically-extended chamber adapted to receive charge input at its upper end through and away from communication with an off-gas collection compartment having an outlet, a continuous-discharge grate at the lower end of the chamber for support and controlled evacuation of chamber charge, an outlet for the material passed by the grate, provision for input of air below the grate for uprise therepast and through the chamber charge, and means for supply of heat requisite to initiate desired pyrolysis of the chamber charge. Operated in known and customary manner for the desired treatment of a charge of the characteristic intermix, whether or not in pellet form, the typical shaft kiln of the diagram, or its functional equivalent, reflects input of air and initial supply of heat to a charge immobilized on the grate to stimulate combustion of the fuel constituent of the charge and rapid elevation of charge temperature promotive of endothermic reactions within the charge and evolution of vapors therefrom. Temperature elevation of the ignited charge sustained by appropriate input of air attains a value at which the heat-induced reactions within the charge become exothermic to a degree eliminating the need for extraneous heat supply, which feasibly is then interrupted, and effective to establish and maintain the temperature critical for evolution of elemental phosphorus from the phosphate rock constituent of the mix. With the charge heated to the requisite critical temperature, continuous infeed of charge to the chamber and actuation of the grate for removal of slag and residue from the chamber are induced to qualify the operation as an uninterrupted progressive processing of the feed attended by off-flow of the evolved vapors from the compartment upwardly terminating the kiln. Since the heat-induced reaction of the fuel with the phosphate rock productive of elemental phosphorus obtains only in a reducing atmosphere, the oxidation of elemental phosphorus to phosphorus pentoxide requires an oxidizing atmosphere, the exothermic reactions generative of the necessary critical heat and self-sustaining thermal operation are inadequate save as augmented by oxidation, and the conversion of phosphorus pentoxide to phosphoric acid occurs but in the presence of water, it is manifest that the single-pass pyrolytic treatment applied as above described to a dry, granular intermix of the characteristic natural materials can not, in and of itself, evolve the desired phosphoric acid product as a direct consequence of the simple heat processing described. for which reasons the conditioning of the intermix to moist, compound pellet form above set forth is uniquely primary to the practice, utility, and advantage of the method of the invention, as hereinbelow explained.

When the intermix of phosphate rock, fuel, and flux processed by and output from the pelletizer is utilized as charge for the shaft kiln, or the equivalent, operated as previously explained, production of phosphoric acid occurs within the single pyrolytic vessel as a direct result of but one characteristic transit of the infeed through the vessel subject to the influences applied thereto and generated therewithin. A charge of the moist, compound pellets presents an intersticed bed exposing the fuel exteriorly coating the individual pellets to the initial heat input and air supply to the kiln for promotion of rapid and intense combustion in a maintained oxidizing atmosphere that contributes to and expedites attainment of the temperature, upwards of 2600° F. critical to evolution of elemental phosphorus from the phosphate rock constituent of the intermix cores of the pellets. Enveloped by and subject to the temperatures so generated exteriorly thereabout, the intermix cores of the pellets emit vapors opposing penetration of oxidizing influences interiorly of the cores and preserving therewithin a reducing atmosphere conducive at critical temperature to the reactions of intermix constituents which result in liberation of elemental phosphorus. Evolved from the intermix cores of the pellets as a vapor, the elemental phosphorus burns to form phosphorus pentoxide vapor in an exothermic reaction with the oxidizing atmosphere sustained exteriorly of the pellets by the air input to the vessel and rises in such state with the vapors of combustion to commingle with the water vapor released from the moist pellets of continuing infeed of charge and therewith react to produce phosphoric acid entrained as a mist or vapor with and as a constituent of the off-gas product of the thermal operation. Translated by the influences of their generation, the vaporous consequences of the continuous, single-pass treatment just described are directed from collection at the upper end of the vessel to and for conventional processing through a Cottrell precipitator, or the functional equivalent, effective in known and customary manner to extract the phosphoric acid constituent of the gas stream for separate delivery in so-called "green" state of an $H_3PO_4$ concentrate susceptible of conventional purification to acceptable commercial quality. Characteristically applied to the generation of vaporous products as above set forth, the pyrolytic vessel, shaft kiln or other, calcines the unvaporized components of the feed as a slag, or clinker, subject to gravity-induced release through the discharge grate and output from the lower end of the vessel.

Certain physical aspects of the continuous, single-pass processing had and applied as above described contribute importantly to the economy and efficiency of the method so distinguished. Activated to critical temperature with continuous infeed of moist, compound pellets, appropriate continuous actuation of the discharge grate, and sustained input of air beneath and for uprise through the grate, the typical shaft kiln, or equivalent vessel, functions in exercise of its usual mode of operation to effectuate the method distinguished by the capabilities peculiar to the composition and organization of the pellet feed. Operating at critical temperature sustained by the air input and exothermic reactions above mentioned, the vessel receives appropriate pressure supply of air at ambient temperature which rises through the discharge grate and superjacent bed of slag or clinker with concomitant dual advantage occasioned by the resulting exchange of heat between the slag and air which serves progressively to raise the temperature of the air moving to the combustion zone and simultaneously to cool the slag for output from the vessel at a moderated temperature that accommodates expedient handling. Uprise of the very hot vapors from the vessel applies with advantage during traverse of the supply of moist pellets continuously infed at ambient temperature for maintenance of vessel charge to progressively preheat the incoming charge material with coincidental generation of water vapor in exposure to the phosphorus pentoxide vapor constituent and to cool the vapor from the combustion zone for collection and subsequent processing at appropriate moderate temperatures attended at suitable values by some condensation helpful to clear entrained solid particles from the gas stream. Due to the operational aspects just discussed, neither preheating of the input supplies appurtenant to practice of the method nor independent cooling of the off-products of the method is requisite, in which respects adaptation of the conventional equipment and its mode of operation to effect intended practice of the method presents significant savings in operating costs and installation expense.

Calcining of the characteristic intermix of phosphate rock, fuel, and flux at the temperatures and under the influences above described conditions the solids residue deprived of volatiles as a slag approaching in composition the attributes of clinker suited for the production of Portland cement. Output in consequence of practice of the improved method applied for the production of phosphoric acid to the intermix of phosphate rock, fuel, and flux as hereinbefore explained, the slag has insignificant utility and but little commercial value, but very simple and entirely feasible addition to the characteristic intermix of a supplementing constituent suffices, at option, to apply the potential of the improved method for production of clinker output upgraded to qualify for use in the manufacture of Portland cement as an incident and without impairment of practice of the method for the production of phosphoric acid, whereby, as is manifest, to augment the economic efficiency of the method through enhancement in the value of an essential by-product of method operation. Deficient to serve as clinker conventionally suited for cement production only for lack of certain constituents, the slag output from practice of the hereindescribed method is relieved of such deficiency through addition to the feed materials supplied to the grinding mill of a proportioned amount of alumina, or of limestone, according to the desired composition of the clinker, which in association with the phosphate rock, fuel, and flux is ground and admixed by the mill as an ingredient of the intermix delivered thence to the pelletizer. Variable in consideration of the particular composition desired for the cement clinker, the assay character of the phosphate rock utilized, the weight analysis of the fuel employed, and the nature and amount of flux included in the intermix, the chemical particularity and proportion of alumina or limestone additive are selectively determinable by and in accordance with customary skill of the art to establish a weight generally on the order of one part of the alumina or limestone additive to about forty-two parts of phosphate rock.

As will be obvious to those acquainted with the techniques herein involved, the improved method is effectively operable to accomplish production of phosphoric acid from an intermix of phosphate rock and fuel of appropriate qualities and specific compositions in the absence of an added flux constituent and without resort to addition of alumina or limestone, recourse to the supplementing feed materials being had only as requisite to facilitate essential reactions and to qualify the slag for use as cement clinker of desired composition.

The chemistry significant to practice of the improved method is conventional and the reactions promoted by the method are orthodox, hence elaboration of the chemical phenomena incident to method operation beyond the particulars of the following exemplary recitation is manifestly unnecessary for competent understanding of the invention.

Application of the improved method for production of phosphoric acid and cement clinker from natural feed materials of known composition progressed as hereinbelow reported.

The primary feed materials utilized were a natural phosphate rock having the assay character

| | Percent |
|---|---|
| $Ca_3(PO_4)_2$ | 67.4 |
| $SiO_2$ | 12.0 |
| $CaCO_3$ | 14.6 |
| $Al_2O_3$ | 2.0 |
| $Fe_2O_3$ | 2.0 |
| $MgCO_3$ | 2.0 | and coal of a weight analysis

| | Percent |
|---|---|
| Fixed carbon | 52 |
| Volatile matter | 39 |
| Water | 5 |
| Ash | 4 |

146.4 pounds of the specified phosphate rock in crushed condition and 20 pounds of the broken coal were combined at the grinding mill with 4.5 pounds of silica and 3.5 pounds of alumina and therein blended and reduced in particle size to constitute a uniform intermix passing a 100-mesh screen as output from the mill.

The 174.4 pounds of intermix from the grinding mill was fed with 35 pounds of water to the pelletizer and thereby consolidated as moist pellets ranging in diameter from ¾ inch to 2 inches progressively exposed at the pelletizer to a supplemental input of 16.7 parts of pulverized coal to 5 parts of water for consequent coating of each pellet of the intermix wtih a moisture-bonded envelope of the added coal, whereby to condition the essential feed materials as a core of intermix within an overlay of fuel distinguishing an array of homologous pellets alike qualified to satisfy subsequent processing requirements incident to the practice and according to the principles of the improved method.

The moist, compound pellet output from the pelletizer was delivered for pyrolytic treatment within a suitable vessel, such as a shaft kiln of the type and organization disclosed by U.S. Patent No. 3,027,147, adapted to effect grate-regulated, downward travel of solids countercurrent to flow of introduced air with collection and salvage of uprising vapors. Infed to a shaft kiln equivalent to that disclosed by the patent just noted and furnished with means for initial supply of heat to the vessel charge, the 231.1 pounds of material output in moist, compound pellet form from the pelletizer was fired in exposure to uprise of air introduced below the grate of its vessel in surplus amount, 666.5 pounds as against an actual requirement of 221.5 pounds, sufficient to maintain an oxidizing atmosphere at all times surrounding each pellet of the charge. Prompt combustion of the fuel exteriorly coating the pellets stimulated by the air upwardly traversing the charge was attended by evolution of combustion gases, evaporation of pellet moisture content, and warming of the pellets with concomitant evolution of volatiles from the intermix of the pellet cores, all of which vapors combined in and with the upward air flow to contribute any exothermic reactions of their release and exposure to the intensity of the combustion. Obviously, certain of the thermally-induced reactions of the pellet constituents were moderately and transiently endothermic, since at about 632° F. the magnesium carbonate present in the intermix decomposes into magnesium oxide and carbon dioxide gas with absorption of heat, but in dominant degree the heat-released volatiles burn in the air stream to stimulate and enhance the intensity of the combustion in progress. Carbon dioxide vapor evolved during heating of the pellet cores migrates to the surface of the pellet and is absorbed within the uprise of vapors through the charge, and at a pellet temperature of approximately 1632° F. the calcium carbonate present in the core intermix decomposes to form calcium oxide and carbon dioxide with some reaction between the latter and the carbon present productive of carbon monoxide which, upon migration to the pellet surface with the associated vapors, burns to carbon dioxide in the oxidizing atmosphere maintained by the uprise of air supply. Sustained and intensified by the predominantly exothermic reactions above noted, temperature of the prevailing combustion increased after interruption of initial heat supply until at a value of 2650° F. the calcium phosphate constituent of the core intermix reacted with the associated carbon available in the mix to liberate elemental phosphorus which migrated as a vapor to the surface of the pellet and there burned in the enveloping oxidizing atmosphere to phosphorus pentoxide vapor in an exothermic reaction.

In connection with the liberation of elemental phosphorus in the manner and at the temperature set forth, it is to be noted that the reaction between the calcium phosphate and carbon occasioning such liberation is effective only in a reducing atmosphere uniquely established and maintained in exclusion from a surrounding oxidizing atmosphere through the ingenious pelletizing treatment of the intermix materials peculiar to the method of the invention. Conditioned in exposure to intense heat as above explained, internal heating of the pellet during combustion of its fuel envelope is attended by evolution of volatiles, such as water, carbon monoxide, carbon dioxide, coal gases, and finally elemental phosphorus, all of which generate as vapors within the pellet and escape thence as pressure emissions which inhibit penetration interiorly of the pellet of oxidizing influences from the atmosphere obtaining exteriorly of the pellet, whereby to maintain exposure of the core intermix to a reducing atmosphere effective as carbon is present in the intermix to sustain at critical heat the reaction liberative of elemental phosphorus.

Entraining water vapor evaporated from the moist pellets of the vessel charge, the air-promoted uprise through the charge not only provides the oxidizing atmosphere suited for the burning of elemental phosphorus to phosphorus pentoxide vapor upon escape from the pellet but also accommodates prompt conversion of the phosphorus pentoxide to phosphoric acid present consequential to a well-known reaction as a mist or vapor in the hot gas stream and therewith translatable to conventional recovery and purification. Processed in the pyrolytic vessel as above explained, the 231.1 pounds of pellet infeed infused to the gas stream uprising with transfer of its heat to the cooler elements of the charge a phosphoric acid integrant which yielded, when conventionally resolved, 62.3 pounds of commercial phosphoric acid having 100% strength.

The constituents of the pellet charge unvolatilized in transit through the zone of critical heat characterizing operation of the pyrolytic vessel during practice of the improved method as hereinbefore explained are calcined by such heat to a slag conditioned in exposure to the flow of air input to the vessel for regulable issue by way of the discharge grate as a cooled clinker product of the method output from the vessel in a composition determined by the nature and proportions of the original feed materials qualifying the clinker for use in the manufacture of Portland cement. The 231.1 pounds of pellet infeed primary to the example herein reported produced 100 pounds of cement clinker at a delivery temperature appropriate for handling and transport thereof. Regulation of discharged grate actuation during continuous practice of the improved method had to adjust and to determine the depth of the bed of slag supported by the grate is applicable to realize a temperature of about 150° F. for the clinker output from the pyrolytic vessel.

Since change, variations, and modifications in the co-actions and correlations hereinbefore described, and in the specifics of feed material combinations and temperature values recited, may be had without departing from the spirit of my invention, I wish to be understood as being limited solely by the scope of the appended claims, rather than by any details of the illustrative representation and foregoing description.

I claim as my invention:

1. The method of producing phosphoric acid which consists of comminuting and concomitantly blending a proportioned intermix of phosphatic rock and solid carbonaceous fuel, pelletizing the intermix as units of from ¾ inch to 2 inch diametric size in exposure to water, individually coating the intermix pellets with water-bonded, crushed, solid carbonaceous fuel, passing the so-coated pellets through combustion temperatures near 2650° F. adequate to decompose the phosphatic rock contactingly through and countercurrent to uprise of air, and recovering from the vapors of combustion the resulting phosphoric acid constituent thereof.

2. The method of producing phosphoric acid which consists of comminuting and concomitantly blending a proportioned intermix of phosphatic rock and solid carbonaceous fuel, pelletizing the intermix as units of from ¾ inch to 2 inch diametric size in exposure to water, individually coating the intermix pellets with water-bonded, crushed, solid carbonaceous fuel, and calcining a continuous feed of the so-coated pellets contactingly through and countercurrent to input of air at temperatures near 2650° F. adequate to decompose the phosphatic rock, whereby to evolve elemental phosphorus in a reducing atmosphere interiorly of the pellets for immediate oxidation by the flow of air upon emission to phosphorus pentoxide in turn directly reactive with the water vapor concomitantly evolved from the moisture-consolidated pellets to form phosphoric acid through the influence of heat incident to and sustained by the exothermic character of the combustion-promoted transformations.

3. The method of producing phosphoric acid which consists of comminuting and concomitantly blending a proportioned intermix of phosphatic rock and solid carbonaceous fuel, pelletizing the intermix as units of from ¾ inch to 2 inch diametric size in exposure to water, individually coating the intermix pellets with water-bonded, crushed, solid carbonaceous fuel, calcining a continuous feed of the so-coated pellets contactingly through and countercurrent to input of air at temperatures near 2650° F. adequate to decompose the phosphatic rock, whereby to evolve elemental phosphorus in a reducing atmosphere interiorly of the pellets for immediate oxidation by the flow of air upon emission to phosphorus pentoxide in turn directly reactive with the water vapor concomitantly evolved from the moisture-consolidated pellets to form phosphoric acid through the influence of heat generation incident to and sustained by the exothermic character of the combustion-promoted transformations, and recovering from the vapors of combustion the resulting phosphoric acid constituents thereof.

4. The method according to claim 3 wherein the intermix utilized contains thirty to thirty-five parts of phosphatic rock combined with from four to eight parts of fuel.

5. The method according to claim 3 wherein the intermix utilized contains thirty to thirty-five parts of phosphatic rock combined with from four to eight parts of fuel and approximately one part of a flux, such as silica.

6. The method according to claim 3 wherein the intermix utilized contains thirty to thirty-five parts of phosphatic rock combined with from four to eight parts of fuel enveloped as pelletized in from three to four additional parts of fuel.

7. The method according to claim 3 wherein the intermix utilized contains thirty to thirty-five parts of phosphatic rock combined with from four to eight parts of fuel and approximately one part of a flux, such as silica, enveloped as pelletized in from three to four additional parts of fuel.

8. The method of coincidentally producing phosphoric acid and clinker useful in the composition of hydraulic cements which consists of comminuting and concomitantly blending a proportioned intermix of phosphatic rock, solid carbonaceous fuel, siliceous flux, and alumina, pelletizing the intermix as units of from ¾ inch to 2 inch diametric size in exposure to water, individually coating the intermix pellets with water-bonded, crushed, solid carbonaceous fuel, and passing the so-coated pellets through combustion temperatures near 2650° F. adequate to decompose the phosphatic rock contactingly through and countercurrent to uprise of air.

9. The method of coincidentally producing phosphoric acid and clinker useful in the composition of hydraulic cements which consists of comminuting and concomitantly blending a proportioned intermix of phosphatic rock, solid carbonaceous fuel, siliceous flux, and alumina, pelletizing the intermix as units of from ¾ inch to 2 inch diametric size in exposure to water, individually coating the intermix pellets with water-bonded, crushed, solid carbonaceous fuel, passing the so-called pellets through combustion temperatures near 2650° F. adequate to decompose the phosphatic rock contactingly through and countercurrent to uprise of air, recovering from the vapors of combustion the resulting phosphoric acid constituent thereof, and separately recovering the combustion-clinkered solids residue output through and subject to the cooling and congealing influence of the input air.

10. The method of coincidentally producing phosphoric acid and clinker useful in the composition of hydraulic cements which consists of comminuting and concomitantly blending a proportioned intermix of phosphatic rock, solid carbonaceous fuel, siliceous flux, and alumina, pelletizing the intermix as units of from ¾ inch to 2 inch diametric size in exposure to water, individually coating the intermix pellets with water-bonded, crushed, solid carbonaceous fuel, and calcining a continuous feed of the so-coated pellets contactingly through and countercurrent to input of air at temperatures near 2650° F. adequate to decompose the phosphatic rock, whereby to evolve elemental phosphorus in a reducing atmosphere interiorly of the pellets for immediate oxidation by the input air upon emission to phosphorus pentoxide in turn directly reactive with the water vapor concomitantly evolved from the moisture-consolidated pellets to form phosphoric acid and to clinker the unvaporized solids content of the pellet charge through the influence of heat generation incident to and sustained by the exothermic character of the combustion-promoted transformations.

11. The method of coincidentally producing phosphoric acid and clinker useful in the composition of hydraulic cements which consists of comminuting and concomitantly blending a proportioned intermix of phosphatic rock, solid carbonaceous fuel, siliceous flux, and alumina, pelletizing the intermix as units of from ¾ inch to 2 inch diametric size in exposure to water, individually coating the intermix pellets with water-bonded, crushed, solid carbonaceous fuel, calcining a continuous feed of the so-coated pellets contactingly through and countercurrent to input of air at temperatures near 2650° F. adequate to decompose the phosphatic rock, whereby to evolve elemental phosphorus in a reducing atmosphere interiorly of the pellets for immediate oxidation by the input air upon emission to phosphorus pentoxide in turn directly reactive with the water vapor concomitantly evolved from the moisture-consolidated pellets to form phosphoric acid and to clinker the unvaporized solids content of the pellet charge through the influence of heat generation incident to and sustained by the exothermic character of the combustion-promoted transformations, recovering from the vapors of combustion the resulting phosphoric acid constituent thereof, and separately recovering the clinkered slag residue output through and subject to the cooling and congealing influence of the input air.

12. The method according to claim 11 wherein the intermix utilized contains thirty to thirty-five parts of phosphatic rock combined with from four to eight parts of fuel, approximately one part of flux, and slightly less than one part of alumina.

13. The method according to claim 11 wherein the intermix utilized contains thirty to thirty-five parts of phosphatic rock combined with from four to eight parts of fuel, approximately one part of flux, and slightly less than one part of alumina enveloped as pelletized in from three to four additional parts of fuel.

14. In a method of producing phosphoric acid through direct, single-phase pyrolysis of source material, the step of preparing the source material for treatment which consists of pelletizing as units of from ¾ inch to 2 inch diametric size in a comminuted intermix of phosphatic rock and solid carbonaceous fuel in exposure to water and individually coating the intermix pellets with water-bonded, crushed, solid carbonaceous fuel, whereby to condition the pellets for combustion in an oxidizing atmosphere at temperatures near 2650° F. adequate to decompose the phosphatic rock with consequent evolution of elemental phosphorus in a reducing atmosphere interiorly of the pellets and accompanying generation of water vapor.

15. In a method of producing phosphoric acid through direct, single-phase pyrolysis of source material, the steps of preparing the source material for treatment as water-bonded pellets of from ¾ inch to 2 inch diametric size having each a core of intermixed phosphatic rock and solid carbonaceous fuel particles enveloped by a coating of crushed solid carbonaceous fuel and calcining said pellets in an oxidizing atmosphere at temperatures near 2650° F. adequate to decompose the phosphatic rock constituent thereof, whereby to effect evolution of elemental phosphorus in a reducing atmosphere interiorly of the pellets and simultaneous generation of water vapor.

References Cited

UNITED STATES PATENTS

| | | | |
|---|---|---|---|
| 3,235,330 | 2/1966 | Lapple | 23—165 |
| 3,241,917 | 3/1966 | Lapple | 23—165 |

OSCAR R. VERTIZ, *Primary Examiner.*

O. F. CRUTCHFIELD, *Assistant Examiner.*